United States Patent [19]
Takano et al.

[11] Patent Number: 5,271,009
[45] Date of Patent: Dec. 14, 1993

[54] DATA TRANSFER METHOD PERFORMED IN A DATA PROCESSOR PROVIDED IN A SWITCHING SYSTEM

[75] Inventors: Ryouzi Takano; Kiyohumi Mitsuze; Takashi Nara, all of Yokohama; Takashi Hatano, Machida; Sumie Morita, Yokohama, all of Japan

[73] Assignee: Fujitsu Limited, Kawasaki, Japan

[21] Appl. No.: 655,054

[22] Filed: Feb. 14, 1991

[30] Foreign Application Priority Data

Feb. 15, 1990 [JP] Japan ................................. 2-34376

[51] Int. Cl.⁵ ............................................. H04J 3/24
[52] U.S. Cl. ................................. 370/94.1; 370/119
[58] Field of Search ................. 370/60, 60.1, 94.1, 370/82, 94.2, 94.3, 85.1; 371/32

[56] References Cited
U.S. PATENT DOCUMENTS

| | | | |
|---|---|---|---|
| 4,704,606 | 11/1987 | Hasley | 370/82 |
| 4,926,416 | 5/1990 | Weik | 370/60.1 |
| 4,991,172 | 2/1991 | Cidon et al. | 370/94.1 |
| 4,999,835 | 3/1991 | Lagoutte | 370/94.1 |
| 5,007,045 | 4/1991 | Tsuzuki | 370/60 |

Primary Examiner—Douglas W. Olms
Assistant Examiner—Hassan Kizou
Attorney, Agent, or Firm—Staas & Halsey

[57] ABSTRACT

A packet data and a header added to a head of the packet data for specifying a transfer condition of the packet data are divided together to data blocks (DBs) each having a designated data length, consisting of an initial DB including the header and an initial part of the packet data, intermediate DBs each including an intermediate part of the packet data and a last DB including a last part of the packet data, so as to be transferred to a data transfer destination in a data processor of a switching system in accordance with write commands for the initial, intermediate and last DBs respectively, and a read command for asking whether the DBs are correctly transferred is sent to the data transfer destination once, after the DBs are transferred. When the DBs are transferred, the packet data is restored at the data transfer destination only by synthesizing the transferred DBs and removing the header.

2 Claims, 7 Drawing Sheets

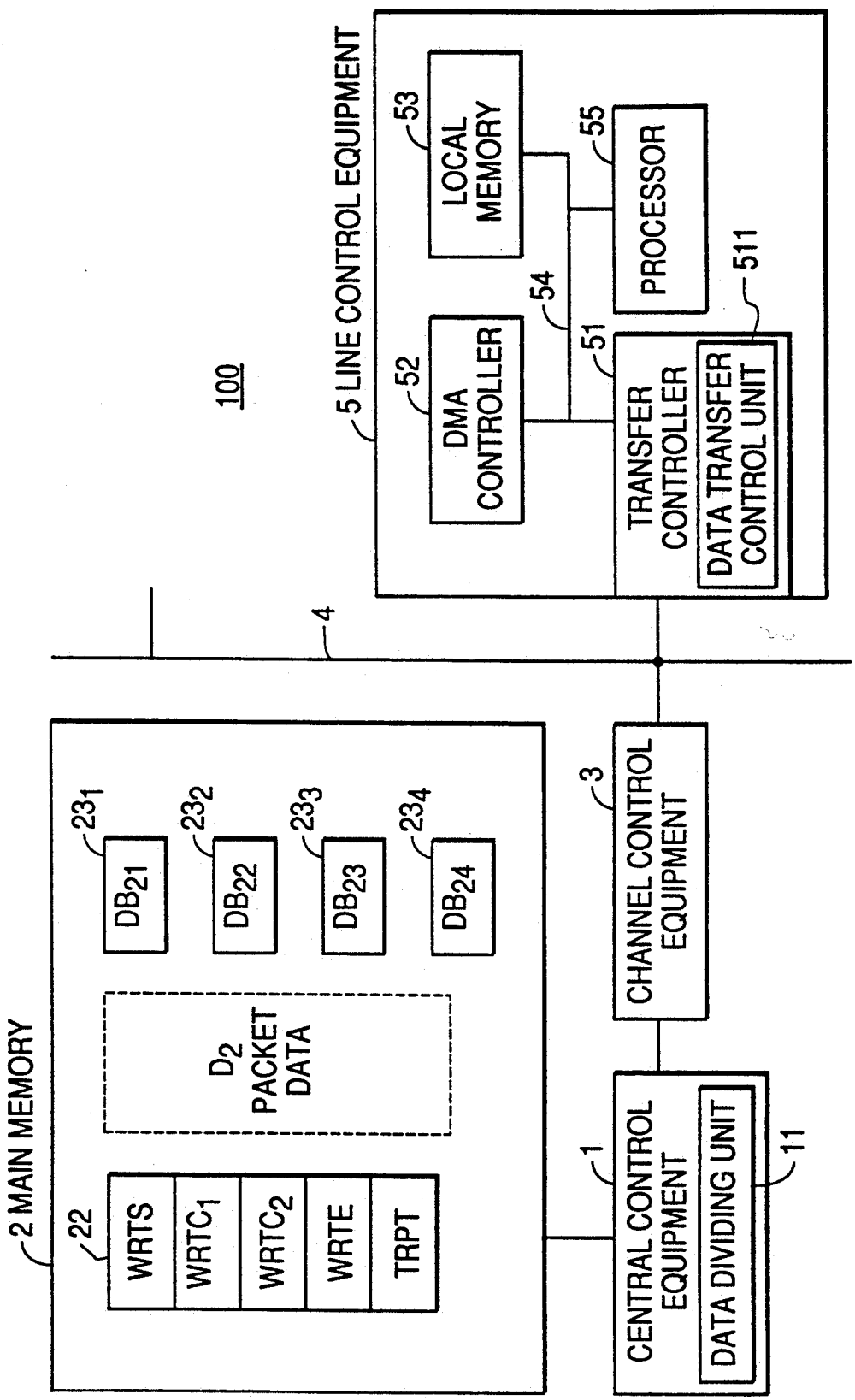

DATA TRANSFER METHOD PERFORMED IN A DATA PROCESSOR PROVIDED IN A SWITCHING SYSTEM

BACKGROUND OF THE INVENTION

1. Field of the Invention

The present invention relates to a data transfer method performed in a data processor for processing a packet data.

In a data processor for processing a packet data in a switching system being for switching telephone information or data, the packet data to be transmitted from the data processor has various length, a short length like several bytes and a long length like several kilo bytes as seen in a call control packet and a data transfer packet respectively.

However, a main memory in the data processor cannot store a packet data having such longest length in a single memory because a memory is generally required to store a limited length like 256 bytes in consideration of the utilization efficiency of the memory. Therefore, when the length of a packet data is more than a limited length, the packet data is divided to a plurality of data blocks so that each data block has less than the limited length. Accordingly, the main memory is divided to a plurality of buffer memory regions so that each region stores a data having less than the limited length. As doing so, the packet data can be stored in the main memory with the high utilization efficiency.

2. Description of the Related Art

FIG. 1 is a block diagram of a data processor 100. In FIG. 1, data blocks and commands used in carrying out the data transfer method of the related art are illustrated in a main memory 2. The state of the data block transferred by the related art method is shown in FIG. 2, and a transfer process of the data blocks performed by the related art method with the associated commands is shown in FIG. 3.

In FIG. 1, data processor 100 comprises a central control equipment 1, a main memory 2, a channel control equipment 3 and a plurality of line control equipments 5. The central control equipment 1 is for controlling the division of the packet data to the data blocks and the transfer of the data blocks. Main memory 2 is for storing the data blocks and various commands for the transfer of the data blocks. Channel control equipment 3 is for controlling data transfer performed through a common bus 4 and a plurality of line control equipments 5, one of which is depicted in FIG. 1, are for controlling the receive and transmit of the packet data in data processor 100.

In main memory 2, a plurality of buffer memory regions, four buffer memory regions $23_1$, $23_2$, $23_3$ and $23_4$ are shown in FIG. 1 representatively, are provided for storing the data blocks so that each buffer memory region has a previously designated buffer memory length m like 256 bytes.

In FIGS. 1, 2 and 3, when data processor 100 receives a packet data $D_1$ having data length $n_1$ larger than m, packet data $D_1$ is divided to a plurality of partial data $SD_{11}$, $SD_{12}$, $SD_{13}$ and $SD_{14}$ so as to have data lengths $1_{11}$, $1_{12}$, $1_{13}$ and $1_{14}$ respectively, and data blocks $DB_{11}$, $DB_{12}$, $DB_{13}$ and $DB_{14}$ are formed by adding headers $H_{11}$, $H_{12}$, $H_{13}$ and $H_{14}$ to partial data $SD_{11}$, $SD_{12}$, $SD_{13}$ and $SD_{14}$ respectively. Headers $H_{11}$, $H_{12}$, $H_{13}$ and $H_{14}$ specify information such as an arranged order of partial data in the packet data and a data length of the corresponding partial data respectively. Data blocks $DB_{11}$, $DB_{12}$, $DB_{13}$ and $DB_{14}$ are stored in buffer memory regions $23_1$, $23_2$, $23_3$ and $23_4$. When a last data block in the train of the data blocks such as $DB_{14}$ has a lack of data length to the memory length m, an invalid data $N_1$ is added for filling the lack.

The central control equipment 1 further provides write commands $WRT_1$, $WRT_2$, $WRT_3$ and $WRT_4$ and read commands called "read patterns on transmission ports" $TRPT_1$, $TRPT_2$, $TRPT_3$ and $TRPT_4$, for data blocks $DB_{11}$, $DB_{12}$, $DB_{13}$ and $DB_{14}$. These write and read commands are stored in a command language memory region 22 in main memory 2 respectively as shown in FIG. 1. The write command is for designating a transfer condition of the corresponding data block such as a transfer direction, a storing address and a data length of the data block. The read command is for asking whether the corresponding data block is correctly transferred to a transfer destination of the data block. After storing the write commands and the read commands in command language memory region 22, central control equipment 1 instructs line control equipment 5 to start the transfer of the data blocks from buffer memory regions $23_1$, $23_2$, $23_3$ and $23_4$ in main memory 2 to a local memory 53 in line control equipment 5.

In line control equipment 5, a transfer controller 51 receives write command $WRT_1$ from command language memory region 22 through channel control equipment 3 and controls a direct memory access (DMA) controller 52 in accordance with $WRT_1$ so as to read data block $DB_{11}$ from buffer memory region $23_1$ and write in local memory 53 through an internal bus 54.

When transfer of data block $DB_{11}$ is over, transfer controller 51 successively receives read pattern $TRPT_1$ from command language memory region 22 and sends a normal acknowledgement called "acknowledgement of normal completed state" $ACK_1$ to central control equipment 1 if the store of data block $DB_{11}$ is correctly performed. Then transfer controller 51 successively receives write command $WRT_2$ from command language memory region 22 and controls DMA controller 52 so as to read data block $DB_{12}$ from buffer memory region $23_2$ and store $DB_{12}$ in local memory 53 through internal bus 54. When transfer of $DB_{12}$ is over, transfer controller 51 successively receives read command $TRPT_2$ from command language memory region 22 and sends normal acknowledgement $ACK_2$ to central control equipment 1 if it is verified that $DB_{12}$ is correctly stored in local memory 53. Thus, transfer controller 51 successively transfers data blocks $DB_{13}$ and $DB_{14}$ from buffer memory regions $23_3$ and $23_4$ to local memory 53 respectively by receiving write commands $WRT_3$ and $WRT_4$ from command language memory region 22 respectively and sending normal acknowledgements $ACK_{13}$ and $ACK_{14}$ to central control equipment 1 every after receiving read patterns $TRPT_{13}$ and $TRPT_{14}$ respectively. The stored state of data blocks and the process of transferring the data blocks mentioned above are shown in FIGS. 2 and 3 respectively. When the transfer of data blocks $DB_{11}$, $DB_{12}$, $DB_{13}$ and $DB_{14}$ is completed, the transferred data blocks are stored in local memory 53 as a stored data $D_1'$ having 4 m data length as shown in FIG. 2.

The stored data $D_1'$ is restored to packet data $D_1$ by a processor 55 in line control equipment 5. The headers $H_{11}$, $H_{12}$, $H_{13}$ and $H_{14}$ are removed from data blocks $DB_{11}$, $DB_{12}$, $DB_{13}$ and $DB_{14}$ respectively and invalid data $N_1$ is also removed from $DB_{14}$ if there is $N_1$ in $DB_{14}$, leaving partial data $SD_{11}$, $SD_{12}$, $SD_{13}$ and $SD_{14}$. Then, packet data $D_1$ having data length $n_1$ is reproduced by synthesizing the left partial data $SD_{11}$, $SD_{12}$, $SD_{13}$ and $SD_{14}$ and forming to a packet. The restored packet data $D_1'$ is sent out to a communication network, not depicted in FIG. 1 but connected to data processor 100, by processor 55.

PROBLEMS IN THE RELATED ART

As seen from the above description of the related art, during the transfer of the data blocks from main memory 2 to line control equipment 5, data blocks $DB_{11}$, $DB_{12}$, $DB_{13}$ and $DB_{14}$ must be formed by adding headers $H_{11}$, $H_{12}$, $H_{13}$ and $H_{14}$ to partial data $SD_{11}$, $SD_{12}$, $SD_{13}$ and $SD_{14}$ respectively, the restoration to the packet data $D_1$ from the stored data $D_1'$ must be performed by removing the headers from the transferred data blocks one by one, and every time each data block is transferred, the write command WRT, the read command TRPT and the acknowledgement ACK must be sent between main memory 2 and line control equipment 5. Thus, in order to transmit packet data $D_1$ from data processor 100, too much complex transfer and restore processes are required in data processor 100, which results in decreasing the data transfer efficiency in data processor 100.

SUMMARY OF THE INVENTION

An object of the present invention is to increase a transfer speed of a packet data in a data processor of a switching system.

Another object of the present invention is to increase transfer efficiency of packet data in the data processor.

Still another object of the present invention is to increase a switching speed of the switching system.

The above objects are achieved by: adding a header (H) for specifying a transfer condition of the packet data to a head of the packet data; dividing the packet data, together with the header, to a plurality of data blocks (DBs) consisting of an initial DB, a plurality of intermediate DBs and a last DB so that each DB has a designated data length; providing write commands such as a "Write command for Start block" (WRTS), a plurality of "Write commands for Continuous block" (WRTCs) and a "Write command for End block" (WRTE); transferring the DBs to a transfer destination such as a local memory in the data processor in accordance with the write commands respectively; sending a read command such as "Read pattern on Transmission port" (TRPT) for asking whether the DBs are correctly transferred to the transfer destination, after the DBs are all transferred; restoring the packet data at the transfer destination only by synthesizing the transferred DBs and removing the header. Applying the present invention to the data processor, it becomes unnecessary to add a header to each DB, to ask the data transfer destination whether DB is correctly transferred every time each DB is transferred, by each read command and to remove the header from each DB when the transferred DBs are restored to the packet data, as done in the related art. This results in increasing the data transfer efficiency of the packet data in the data processor.

DESCRIPTION OF THE PREFERRED EMBODIMENTS

Figure 3:
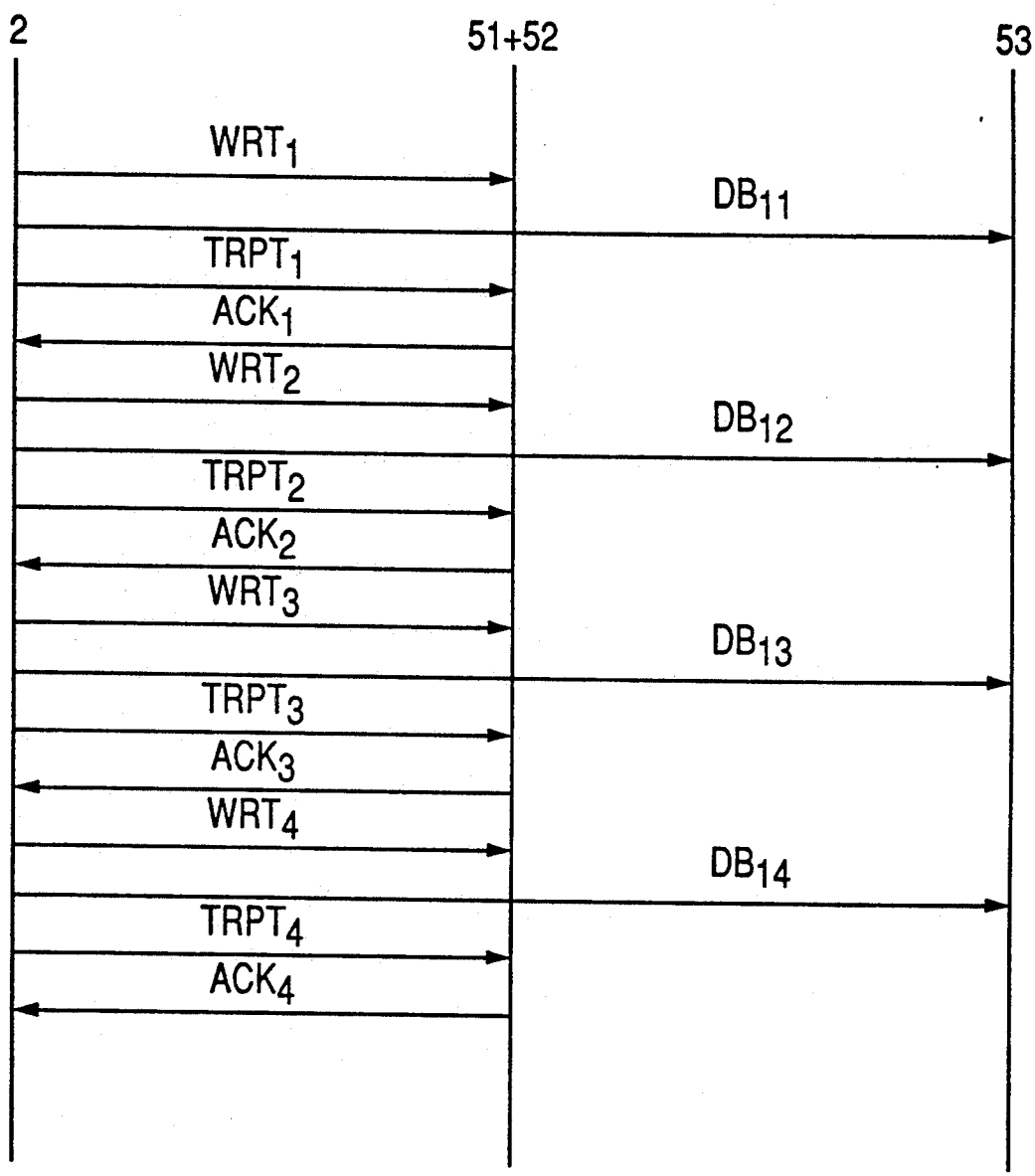
FIG. 3 is an illustration showing a data transfer process performed by the related art data transfer method.
Figure 4:
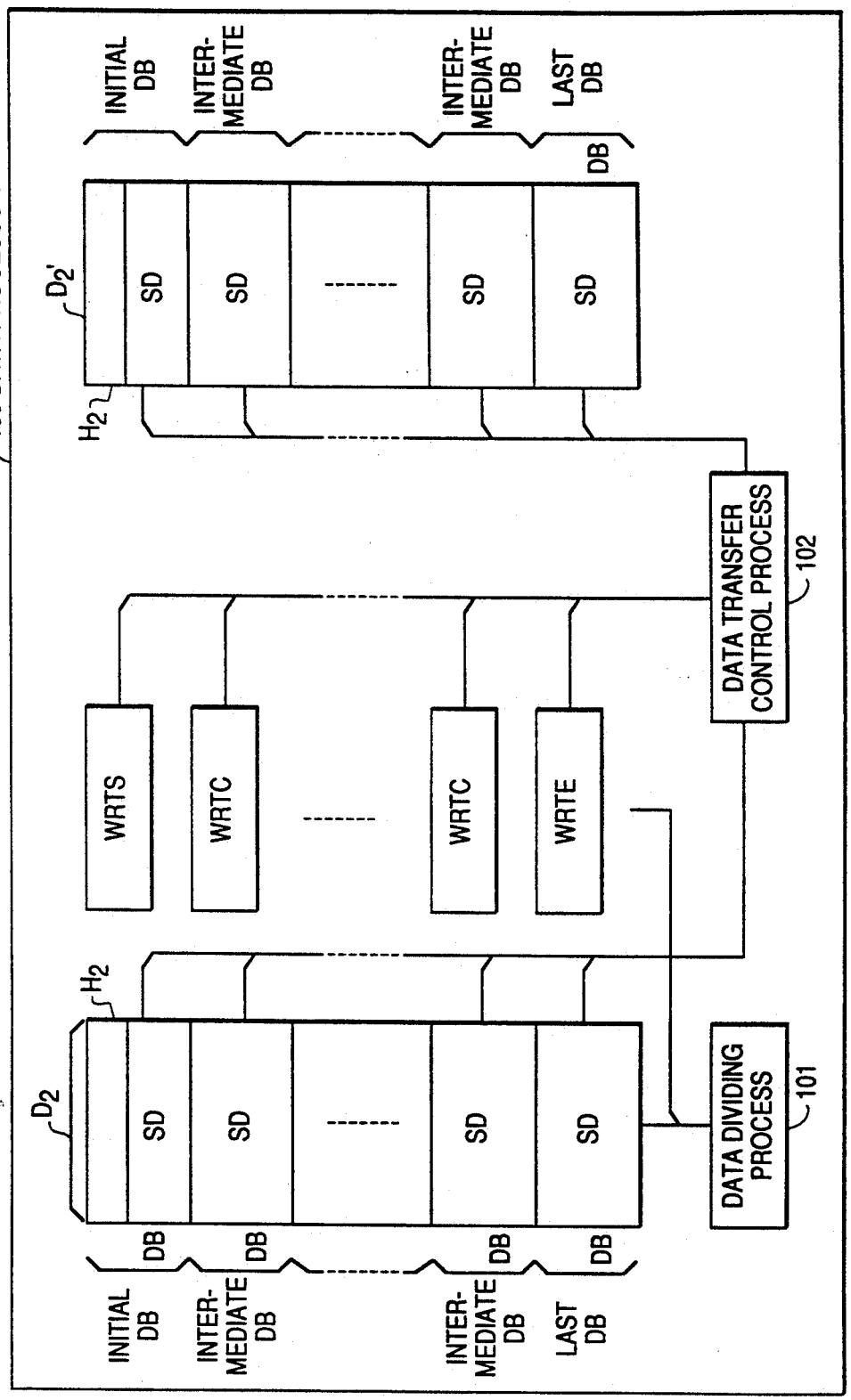
FIG. 4 is an illustration for explaining a principle of the present invention.

Before describing the preferred embodiment of the present invention, a principle of the present invention will be explained in reference to FIG. 4, for the sake of realizing the present invention. FIG. 4 illustrates the principle of the present invention. In FIG. 4, the same reference numeral or symbol as in FIGS. 1, 2 and 3 designates the same equipment, data or command as in FIGS. 1, 2 and 3. In data processor 100 in FIG. 4, a packet data $D_2$ is transferred within data processor 100 in accordance with a data dividing process 101 and a data transfer control process 102. Because of applying data dividing process 101 to data processor 100, a packet data $D_2$ is divided to a plurality of data blocks and stored in memory regions, and several kinds of commands are produced and stored in other memory regions. In the present invention, only one header $H_2$ is added to a head of packet data $D_2$ and a data consisting of header $H_2$ and packet data $D_2$ is divided to a plurality of data blocks DBs so that each DB has a data length of m, and three kinds of write commands, a write command called "Write command for Start block" (WRTS), a plurality of write commands called "Write commands for Continuous block" (WRTCs) and a write command called "Write command for End block" (WRTE), are produced. The WRTS is for specifying a transfer condition of an initial DB including header $H_2$ and an initial partial data of packet data $D_2$: WRTC is for specifying a transfer condition of an intermediate partial data of packet data $D_2$ and WRTE is for specifying a transfer condition of a last (or end) partial data of packet data $D_2$. These data blocks (DBs) and commands (WRTS, WRTCs and WRTE) are stored in corresponding memory regions in main memory 2 of data processor 100.

Because of data transfer control process 102, data blocks DBs stored in corresponding memory regions are read and transferred within data processor 100 in accordance with commands WRTS, WRTCs and WRTE which are read from corresponding memory regions.

As a result, when packet data $D_2$ is transferred within data processor 100, header $H_2$ is added only once to packet data $D_2$ before transferring the data blocks (DBs). In other words, it becomes unnecessary to add headers to a plurality of partial data respectively as done in the related art. As a result, when the transfer of the data blocks is over, the packet data can reproduced by simply synthesizing the transferred data blocks and removing only one header $H_2$. It is not necessary to remove respective header from each data block as done in the related art.

Consequently, because of applying the present invention to data processor 100, the data division and data restoration become simpler than those in case of applying the related art method, resulting in increasing the data transfer efficiency.

Figure 6:
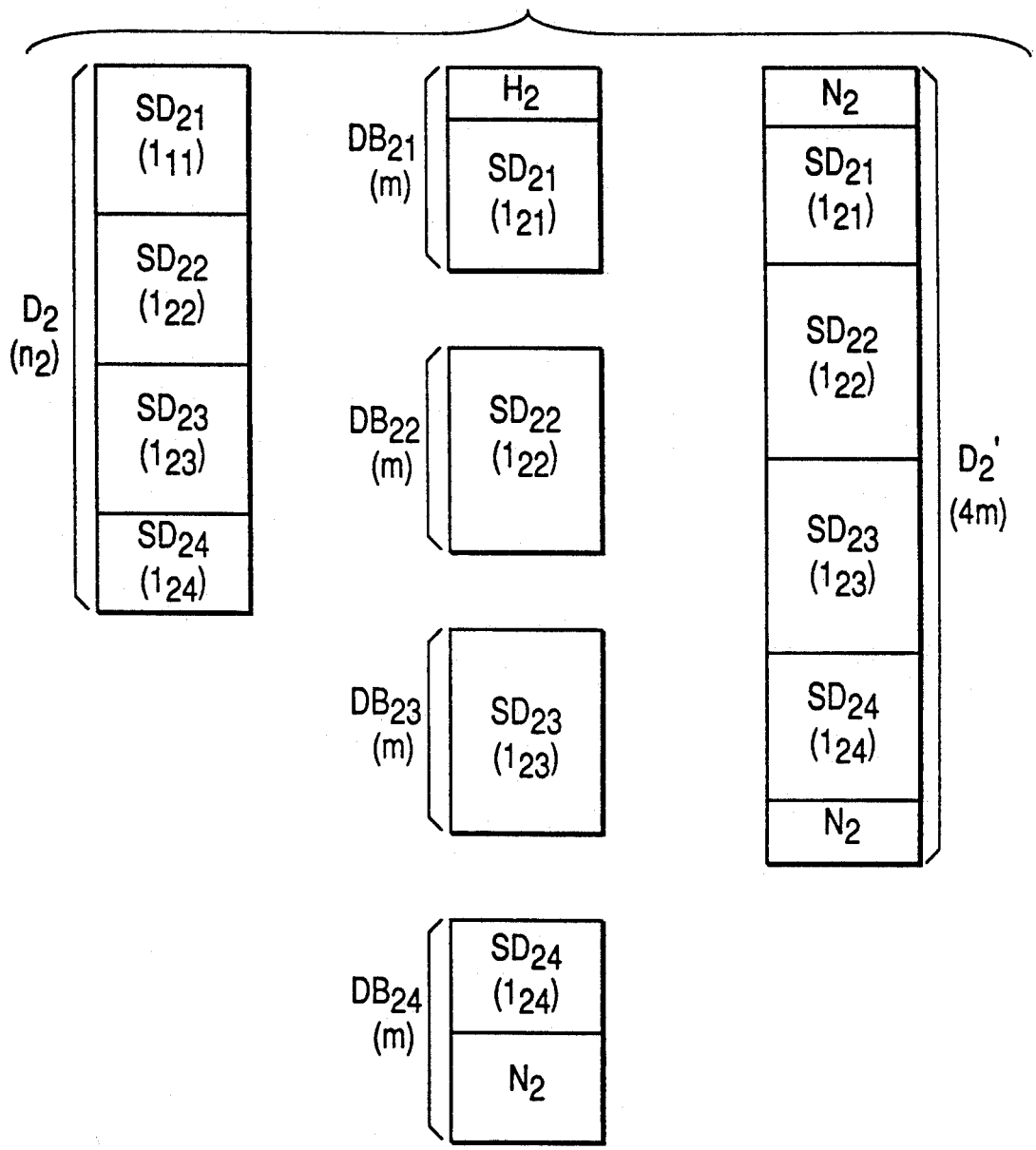
FIG. 6 is an illustration for explaining a state of data division and transfer performed by the data transfer method of the present invention.
Figure 7:
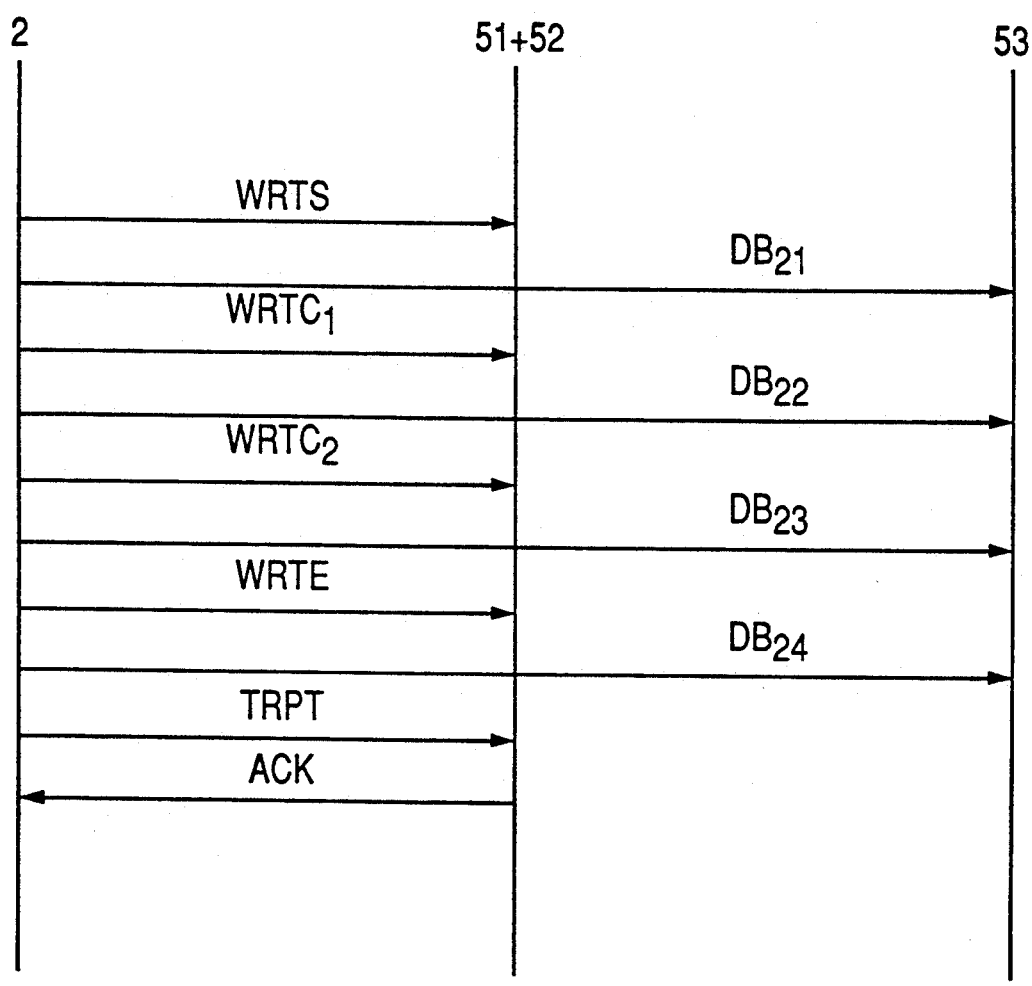
FIG. 7 is an illustration showing a data transfer process performed by the data transfer method of the present invention.
Figure 1:
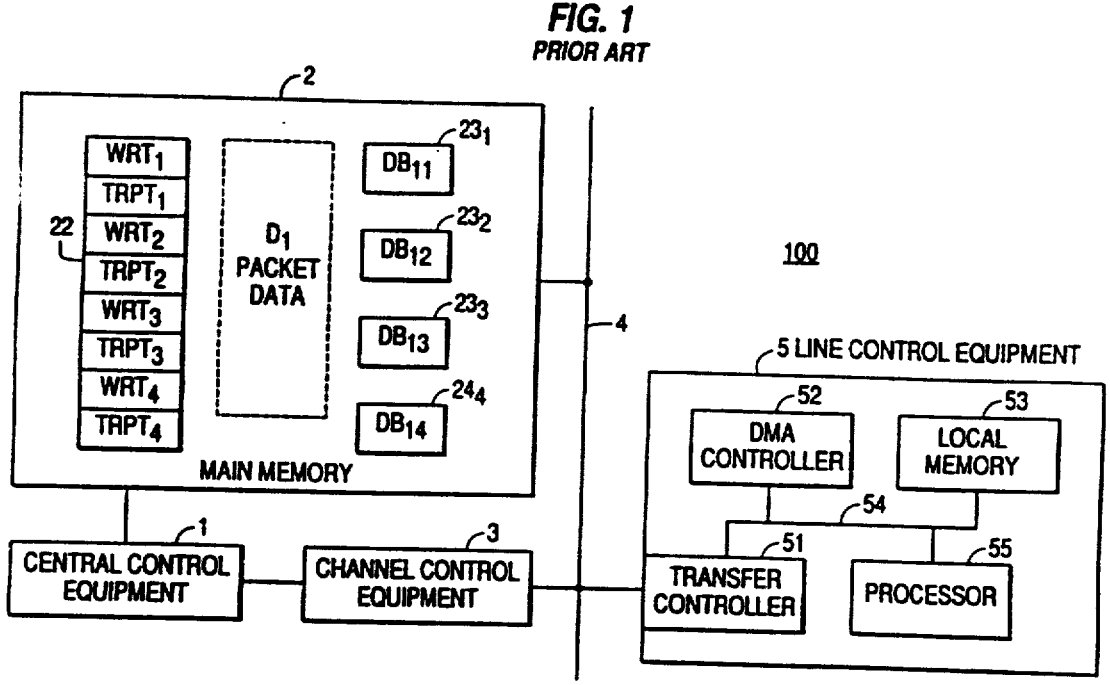
Figure 5:
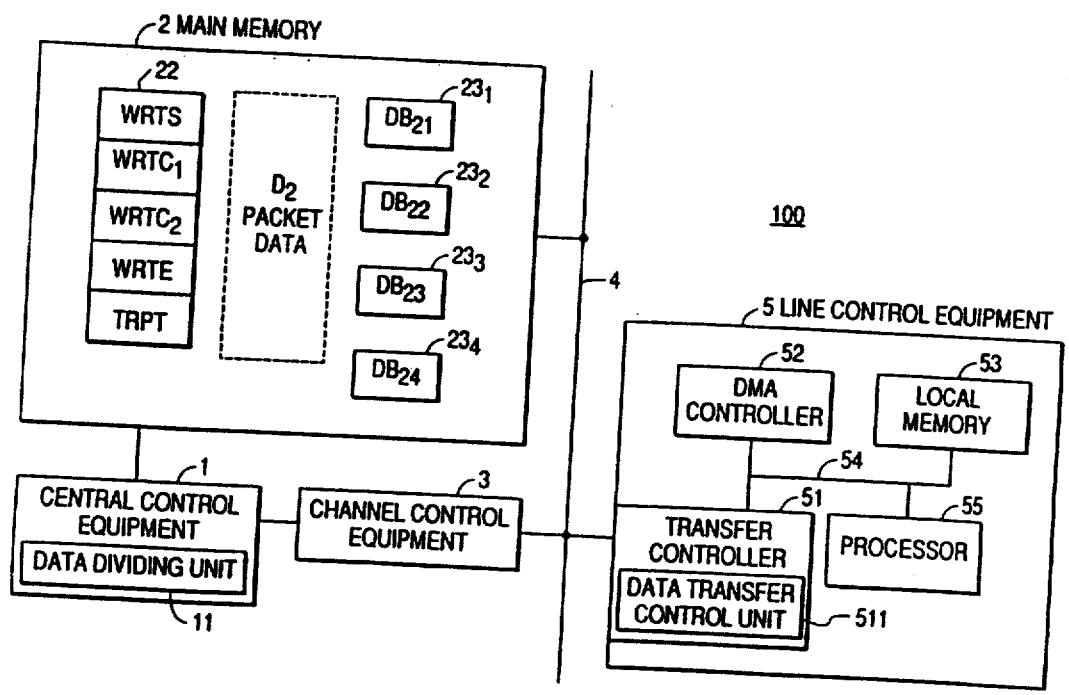
FIG. 5 is a block diagram of a data processor to which a data transfer method of the present invention is applied.

An example of an embodiment of the present invention will be explained in reference to FIGS. 5, 6 and 7. FIG. 5 is a block diagram of data processor 100 in which the data transfer method embodying the present invention is carried out. FIG. 6 illustrates an exampled state of data division and transfer performed by the embodying method, and FIG. 7 shows an exampled process of data transfer, performed by the embodying method. In FIGS. 5 to 7, the same reference numeral or symbol as in FIGS. 1 to 4 designates the same equipment, data or header as in FIGS. 1 to 4.

In FIG. 5, a data dividing unit 11 used for performing data dividing process 101 in FIG. 4 is represented in central control equipment 1, and a data transfer control unit 511 used for performing data transfer control process 102 in FIG. 4 is represented in transfer controller 51.

Figure 1:
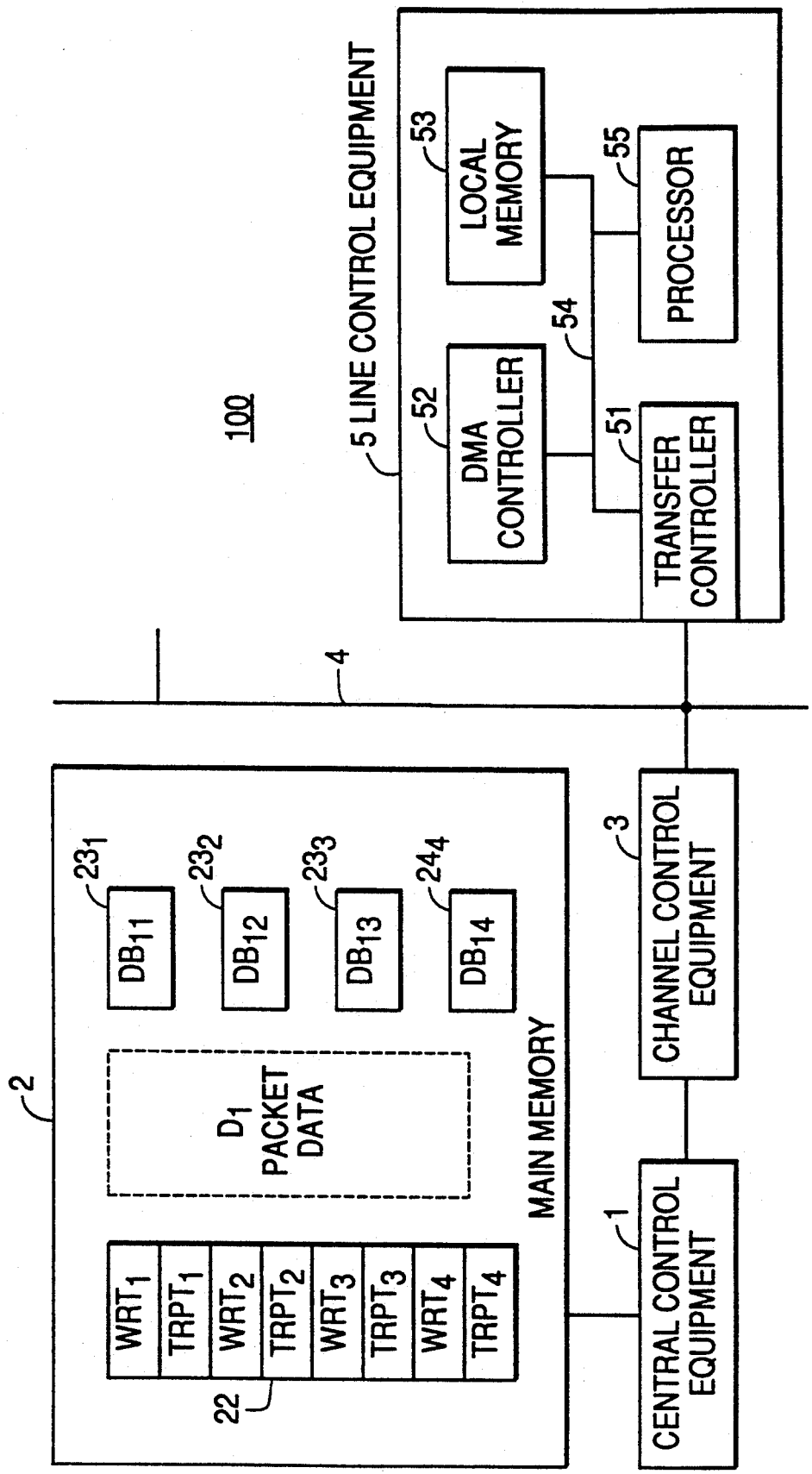
FIG. 1 is a block diagram of a data processor to which a related art data transfer method has been applied.
Figure 2:
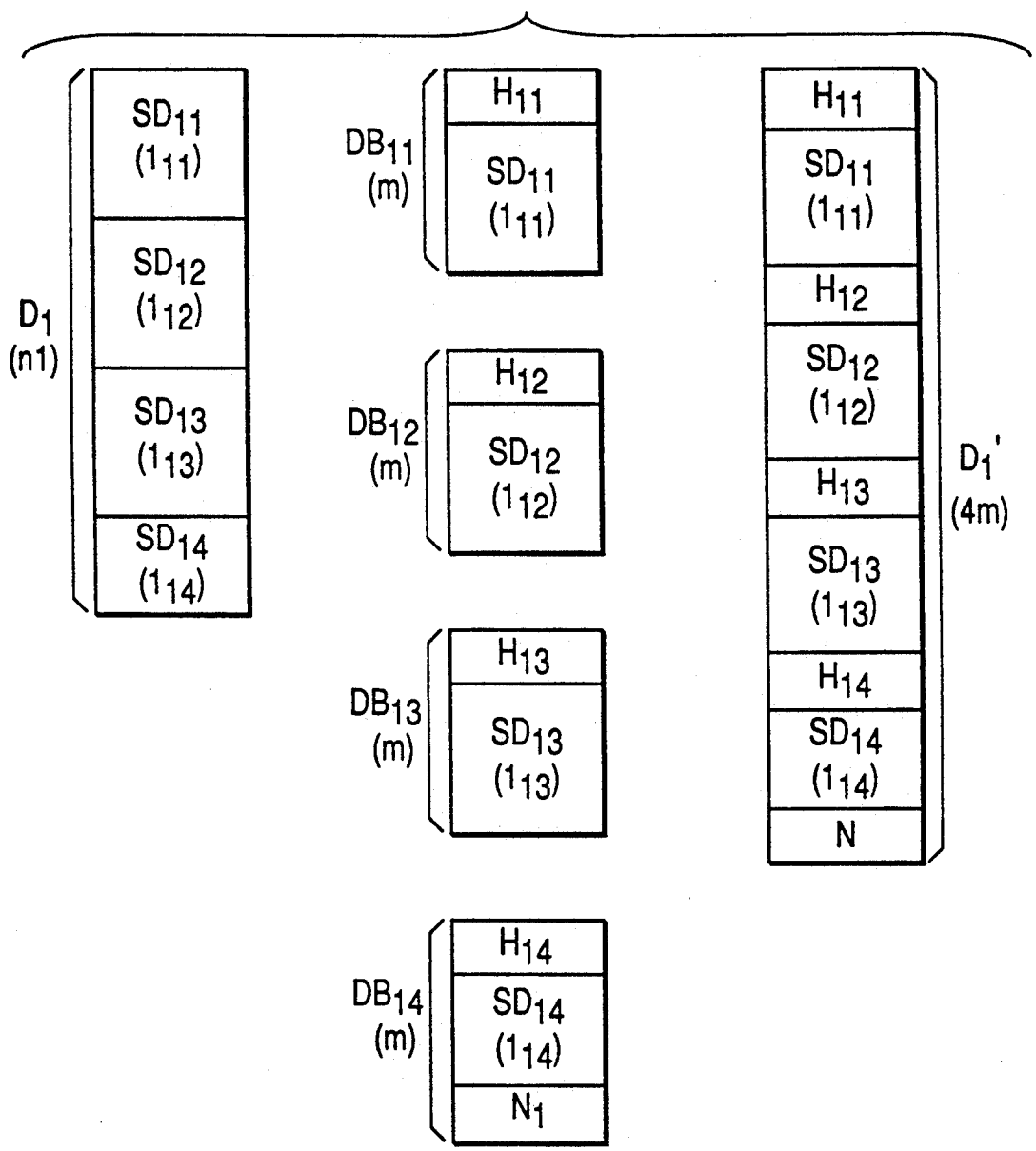
FIG. 2 is an illustration for explaining a state of data division and transfer performed by the related art data transfer method.

In main memory 2 in FIG. 5, same as explained in the related art in reference to FIG. 1, a plurality of buffer memory regions, for example, four buffer memory regions $23_1$, $23_2$, $23_3$ and $23_4$, are provided for storing data blocks $DB_{21}$, $DB_{22}$, $DB_{23}$ and $DB_{24}$ which are to be transferred from main memory 2 to line control equipment 5 through common bus 4. However, as seen in comparison with the related art in FIG. 2, in FIG. 6, the data blocks include no header except an initial data block ($DB_{21}$) including the initial partial data ($SD_{21}$). In other words, in the related art, each data block, e.g. $DB_{21}$, consists of the header, e.g. $H_{12}$, and the partial data, e.g. $SD_{12}$, as shown in FIG. 2, however in the present invention, only the initial data block ($DB_{21}$) including header $H_2$, and other data blocks ($DB_{22}$, $DB_{23}$ and $DB_{24}$) include only partial data ($SD_{22}$, $SD_{23}$ and $SD_{24}$) respectively as shown in FIG. 6.

In FIGS. 5 to 7, when packet data $D_2$ having a data length of $n_2$ larger than m is intended to be transmitted from the data processor 100 to the exterior thereof through communication network not depicted in FIG. 5, central control equipment 1, in particular, data dividing unit 11 controls the transfer of packet data $D_2$ from main memory 2 to line control equipment 5 in accordance with the following processes: adding a header $H_2$ including information on, for example, data length $n_1$ to packet data $D_2$; dividing packet data $D_2$ to a plurality of partial data $SD_{21}$, $SD_{22}$, $SD_{23}$ and $SD_{24}$ so that the partial data have partial data lengths $l_{21}$, $l_{22}$, $l_{23}$ and $l_{24}$ respectively; forming data blocks $DB_{21}$, $DB_{22}$, $DB_{23}$ and $DB_{24}$ from partial data $SD_{21}$, $SD_{22}$, $SD_{23}$ and $SD_{24}$ respectively so that the DBs has a data length of m respectively; and storing data blocks $DB_{21}$, $DB_{22}$, $DB_{23}$ and $DB_{24}$ in buffer memory regions $23_1$, $23_2$, $23_3$ and $23_4$ respectively.

Accordingly as shown in FIG. 6, an initial data block $DB_{21}$ consists of header $H_2$ and partial data $SD_{21}$ (the data length m of $DB_{21}$ is equal to the sum of a data length of $H_2$ and the partial data length $l_{21}$ of $SD_{21}$) and intermediate data blocks $DB_{22}$ and $DB_{23}$ consist of partial data $SD_{22}$ and $SD_{23}$ respectively so that the data length m of $DB_{22}$ ($DB_{23}$) is equal to the partial data length $l_{22}$ ($l_{23}$) of partial data $SD_{22}$ ($SD_{23}$) Regarding the last $DB_{24}$, if the partial data length $l_{24}$ of $SD_{14}$ is m, the last $DB_{24}$ consists of only partial data $SD_{24}$, however, if $l_{24}$ is shorter than m, an invalid data $N_2$ is included so that $DB_{24}$ has the data length of m, as shown in FIG. 7.

Furthermore, data dividing unit 11 produces write commands WRTS, WRTCs ($WRTC_1$ and $WRTC_2$) and WRTE and a read pattern TRPT. The write command WRTS is for the initial data block $DB_{21}$ and for informing that the $DB_{21}$ is the initial partial data of packet data $D_2$ and specifying the transfer conditions of $DB_{21}$ such as a transfer direction, an address to be stored and a data length of $DB_{21}$, the write command WRTC is a command for the intermediate data block $DB_{22}$ ($DB_{23}$) and for informing that the $DB_{22}$ ($DB_{23}$) is the intermediate partial data of packet data $D_2$ and specifying the transfer conditions of $DB_{22}$ ($DB_{23}$) same as the case of the write command WRTS, the write command WRTE is a command for the last data block $DB_{24}$ and for informing that the $DB_{24}$ is the last partial data of packet data $D_2$ and specifying the transfer conditions of $DB_{24}$ same as the case of WRTE, and the read command TRPT is a command for asking whether data blocks $DB_{21}$, $DB_{22}$, $DB_{23}$ and $DB_{24}$ are all correctly transferred to data transfer destinations. After producing the write commands and read command, data dividing unit 11 occupies common bus 4 and instructs the start of the data transfer to line control equipment 5 through channel control equipment 3 and common bus 4.

In line control equipment 5, data transfer control unit 511 receives WRTS from command language memory region 22 through channel control equipment 3 and controls DMA controller 52 under the command WRTS so that $DB_{21}$ is read from buffer memory region $23_1$ and stored in local memory 53 through internal bus 54.

When the transfer of $DB_{21}$ is over, data transfer control unit 511 successively receives $WRTC_1$ from command language memory region 22 through channel control equipment 3 and controls DMA controller 52 under the command of $WRTC_1$ so that $DB_{22}$ is read from buffer memory region $23_2$ and stored in local memory 53 through internal bus 54.

When the transfer of $DB_{22}$ is over, another intermediate data blocks $DB_{23}$ is stored in local memory 54 successively with the same step as the case of $DB_{22}$.

When the transfer of intermediate data block $DB_{23}$ is over, data transfer control unit 511 successively receives WRTE from command language memory region 22 through channel control equipment 3 and controls DMA controller 52 under the command WRTE so that $DB_{24}$ is read from buffer memory region $23_4$ and stored in local memory 53 through internal bus 54.

When the transfer of the last data block $DB_{24}$ is over, data transfer control unit 511 successively receives TRPT from command language memory region 22 through channel control equipment 3 and sends back normal acknowledgement ACK to central control equipment 1 after confirming that $DB_{21}$, $DB_{22}$, $DB_{23}$ and $DB_{24}$ are correctly transferred to local memory 53.

Incidently, when the transfer of the last data block $DB_{24}$ is over correctly, a data $D_2'$ consisting of data blocks $DB_{21}$ to $DB_{24}$ and having a data length of 4 m is stored in local memory 53 as shown in FIG. 6, and since common bus 4 is occupied only for the transfers of $DB_{21}$, $DB_{22}$, $DB_{23}$ and $DB_{24}$, other data blocks are never transferred by mistake.

By means of processor 55 in line control equipment 5, the $D_2'$ are read from local memory 53 and simply combined and the data $D_2'$ is restored to the packet data $D_2$ having $n_2$ data length by removing header $H_2$ and invalid data $N_2$ if there is $N_2$ in the last data block $DB_{24}$.

When one of or some of data blocks $DB_{21}$, $DB_{22}$, $DB_{23}$ and $DB_{24}$ are not transferred correctly, transfer controller 51 sends "Acknowledgement of abnormal completed state" (NCK) back to central control equipment 1 instead of normal acknowledgement ACK, then central control equipment 1 starts to transfer the data blocks $DB_{21}$, $DB_{22}$, $DB_{23}$ and $DB_{24}$ again.

As seen from the above embodiment, the transfer of the data blocks $DB_{21}$, $DB_{22}$, $DB_{23}$ and $DB_{24}$ from buffer memory regions $23_1$, $23_2$, $23_3$ and $23_4$ to local memory 53 is performed only by adding header $H_2$ to the initial data block $DB_{21}$ and by adding invalid data $N_2$ to the last data block $DB_4$ if necessary. Therefore, the packet data $D_2'$ can be simply restored to packet data $D_2$ by synthesizing the transferred data blocks in $D_2'$ and removing header $H_2$ and invalid data $N_2$ from $D_2'$. As a result, the data division performed with central control equipment 1 and the data restoration performed in line control equipment 5 can be performed extremely simply in comparison with the related art. Furthermore, since ACK can be sent back to central control equipment only once after the last data block $DB_4$ is over, it becomes not necessary to send ACKs ($ACK_1$, $ACK_2$, $ACK_3$ and $ACK_4$) every after each data block is over, which also simplifies the data transfer process.

In the embodiment of the present invention, packet data $D_2$ is divided to four data blocks $DB_{21}$, $DB_{22}$, $DB_{23}$ and $DB_{24}$, however, the divided numbers are not limited to four. Further, packet data $D_2$ is transferred from main memory 2 to line control equipment 5, however, packet data can be transferred in any direction in data processor 100. Still further, the data transfer control process 102 explained in reference to FIG. 4 is performed by transfer controller 51 in line control equipment 5, however, not limited by transfer controller 51. The process 102 can be performed by any equipment, for example, by channel control equipment 3. Furthermore, the block diagram of data processor 100 is not limited to that shown in FIG. 5. The present invention can be applied to any type of data processor which processes a packet data.

What is claimed is:

1. A data processor used in a switching system, for processing a packet data transferred in the data processor, said data processor comprising:
   central control equipment for controlling a transfer process of the packet data, said central control equipment comprising:
   means for adding a header to the packet data, the header specifying a data length of the packet data,
   means for dividing the header and the packet data to a plurality of data blocks comprising an initial data block including the header and an initial part of the packet data, a plurality of intermediate data blocks each including an intermediate part of the packet data and a last data block including a last part of the packet data, so that each of the data blocks has a designated data length, and
   means for producing write commands, the write commands comprising a first write command, a plurality of second write commands and a third write command, the first write command indicating that a data block commanded by the first write command is the initial data block and specifying a transfer direction and address of the initial data block, the second write command indicating that a data block commanded by the second write command is the intermediate data block and specifying a transfer direction and address of each of the intermediate data blocks and the third write command indicating that a data block commanded by the third write command is the last data block and specifying a transfer direction and address of the last data block;
   a main memory comprising:
   first memory means for storing the data blocks, and
   second memory means for storing the write commands; and
   line control equipment comprising:
   control means for controlling transfer of the data blocks stored in said first memory means, for controlling the storing of the data blocks transferred from said first memory means and for controlling the transfer and the storing in accordance with the write commands stored in said second memory means,
   third memory means for storing the data blocks transferred from said first memory means, and
   processor means for restoring the packet data by synthesizing the data blocks stored in said third memory means and for removing the header from the data blocks stored in said third memory means.

2. A data processor according to claim 1, wherein said central control equipment further comprises means for producing a read command to ask said line control equipment whether the data blocks are correctly transferred to said third memory means, and
said control means in said line control equipment comprises means for answering with an acknowledgement to indicate whether the data blocks are correctly stored in said third memory means back to said central control equipment.

* * * * *

UNITED STATES PATENT AND TRADEMARK OFFICE
CERTIFICATE OF CORRECTION

PATENT NO. : 5,271,009
DATED : December 14, 1993
INVENTOR(S) : Ryouzi Takano, et. al.

It is certified that error appears in the above-indentified patent and that said Letters Patent is hereby corrected as shown below:

The title page showing the illustrative figure should be deleted and substitute therefor the attached title page.

Figures 1 and 5 should be deleted to be replaced with Figures 1 & 5 shown on the attached sheets.

United States Patent [19]
Takano et al.

[11] Patent Number: 5,271,009
[45] Date of Patent: Dec. 14, 1993

[54] DATA TRANSFER METHOD PERFORMED IN A DATA PROCESSOR PROVIDED IN A SWITCHING SYSTEM

[75] Inventors: Ryouzi Takano; Kiyohumi Mitsuze; Takashi Nara, all of Yokohama; Takashi Hatano, Machida; Sumie Morita, Yokohama, all of Japan

[73] Assignee: Fujitsu Limited, Kawasaki, Japan

[21] Appl. No.: 655,054

[22] Filed: Feb. 14, 1991

[30] Foreign Application Priority Data

Feb. 15, 1990 [JP] Japan .................. 2-34376

[51] Int. Cl.[5] .................................. H04J 3/24
[52] U.S. Cl. .......................... 370/94.1; 370/119
[58] Field of Search ............. 370/60, 60.1, 94.1, 370/82, 94.2, 94.3, 85.1; 371/32

[56] References Cited

U.S. PATENT DOCUMENTS

| | | | |
|---|---|---|---|
| 4,704,606 | 11/1987 | Hasley | 370/82 |
| 4,926,416 | 5/1990 | Weik | 370/60.1 |
| 4,991,172 | 2/1991 | Cidon et al. | 370/94.1 |
| 4,999,835 | 3/1991 | Lagoutte | 370/94.1 |
| 5,007,045 | 4/1991 | Tsuzuki | 370/60 |

*Primary Examiner*—Douglas W. Olms
*Assistant Examiner*—Hassan Kizou
*Attorney, Agent, or Firm*—Staas & Halsey

[57] ABSTRACT

A packet data and a header added to a head of the packet data for specifying a transfer condition of the packet data are divided together to data blocks (DBs) each having a designated data length, consisting of an initial DB including the header and an initial part of the packet data, intermediate DBs each including an intermediate part of the packet data and a last DB including a last part of the packet data, so as to be transferred to a data transfer destination in a data processor of a switching system in accordance with write commands for the initial, intermediate and last DBs respectively, and a read command for asking whether the DBs are correctly transferred is sent to the data transfer destination once, after the DBs are transferred. When the DBs are transferred, the packet data is restored at the data transfer destination only by synthesizing the transferred DBs and removing the header.

2 Claims, 7 Drawing Sheets

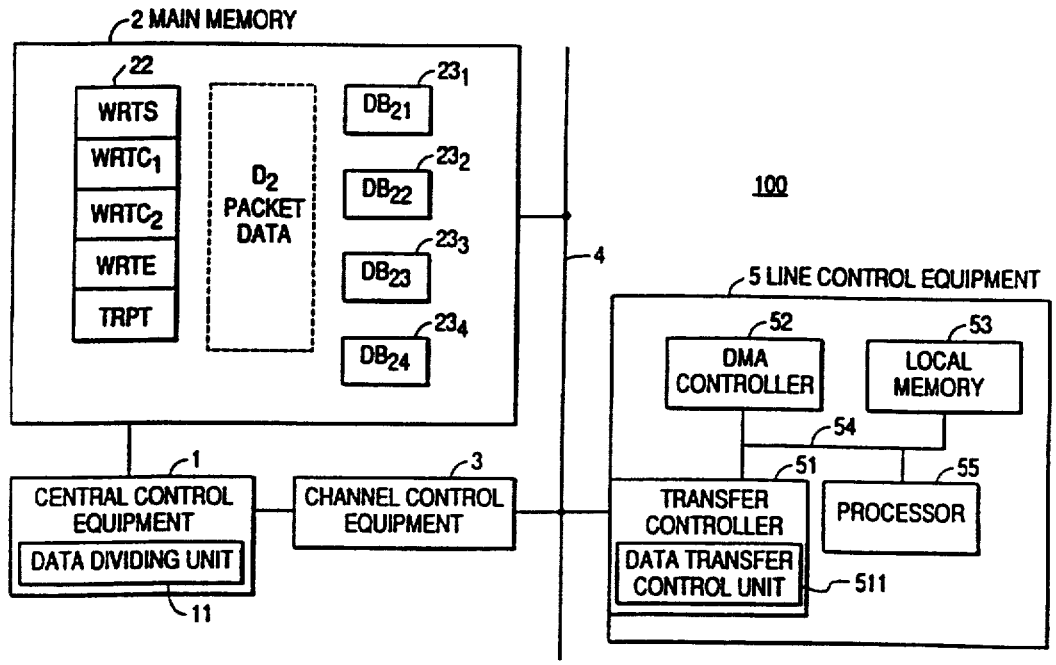

UNITED STATES PATENT AND TRADEMARK OFFICE
CERTIFICATE OF CORRECTION

PATENT NO.  : 5,271,009
DATED       : December 14, 1993
INVENTOR(S) : Ryouzi Takano, et. al.

It is certified that error appears in the above-indentified patent and that said Letters Patent is hereby corrected as shown below:

Col. 4,   line 51, change ":" to --.--.

Col. 5,   line 61, change "the DBs" to --each DB--.

Col. 6,   line 65, change "Incidently" to --Incidentially--.

Signed and Sealed this

Fourteenth Day of February, 1995

Attest:

BRUCE LEHMAN

Attesting Officer          Commissioner of Patents and Trademarks